(12) United States Patent
Wnek et al.

(10) Patent No.: US 6,299,052 B1
(45) Date of Patent: Oct. 9, 2001

(54) ANTI-SLIDE SPLICE WELDER

(75) Inventors: John Wnek, Westbrook; James Markus, Shelton, both of CT (US)

(73) Assignee: American Technology, Inc., Shelton, CT (US)

( * ) Notice: Subject to any disclaimer, the term of this patent is extended or adjusted under 35 U.S.C. 154(b) by 0 days.

(21) Appl. No.: 09/606,251

(22) Filed: Jun. 28, 2000

(51) Int. Cl.$^7$ .................................................. B23K 20/10
(52) U.S. Cl. ........................................ 228/110.1; 228/1.1
(58) Field of Search .................................... 228/1.1, 44.7, 228/110.1, 44.3, 212; 29/872, 873; 310/323.18, 325; 156/580.1, 580.2, 73.2; 219/56, 56.1, 56.21

(56) References Cited

U.S. PATENT DOCUMENTS

| | | |
|---|---|---|
| 4,596,352 * | 6/1986 | Knapp . |
| 4,730,764 | 3/1988 | Hawkins et al. . |
| 4,782,990 | 11/1988 | Patrikios et al. . |
| 4,789,095 * | 12/1988 | Kobayashi . |
| 4,799,614 | 1/1989 | Welter et al. . |
| 4,867,370 | 9/1989 | Welter et al. . |
| 4,869,419 * | 9/1989 | Nuss . |
| 5,011,062 * | 4/1991 | Nakanishi et al. . |
| 5,772,100 * | 6/1998 | Patrikios . |
| 5,921,457 | 7/1999 | Patrikios . |
| 6,070,777 * | 6/2000 | Patrikios et al. . |

* cited by examiner

Primary Examiner—Tom Dunn
Assistant Examiner—Jonathan Johnson
(74) Attorney, Agent, or Firm—St. Onge Steward Johnston & Reens LLC

(57) ABSTRACT

An ultrasonic welder for splicing a plurality of workpieces has four anvils, each formed with a meeting surface and displaceable to form a workpiece nest, which has a rectangular shape of a predetermined width. The width of the workpiece nest is sufficient to receive only at least one vertical column of workpieces to be welded, so as to produce a vertical splice. The ultrasonic welder further has a controller controlling a starting position of tooling, which forms the predetermined width of the workpiece nest, and displacing at least one of tools, which form side faces of the nest in reciprocal and time controlled manner. The displaceable tool is brought back to its starting position corresponding to the predetermined width of the workpiece nest before a new bundle of workpieces is loaded therein.

10 Claims, 4 Drawing Sheets

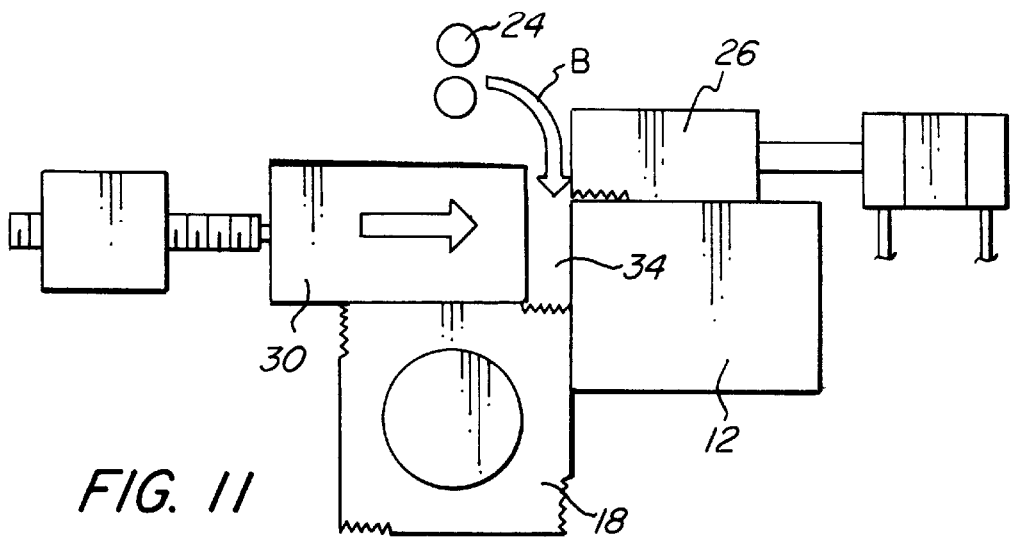
FIG. 11
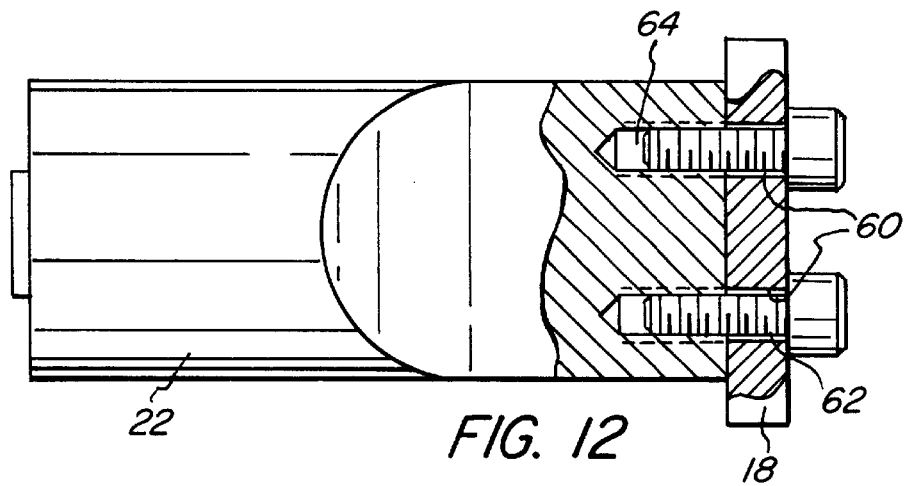
FIG. 12
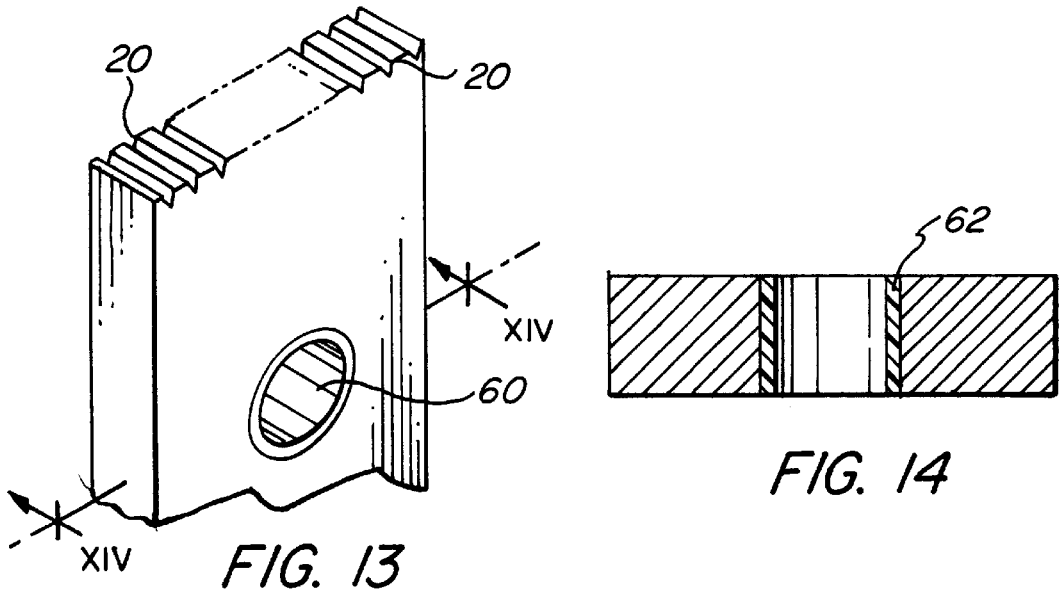
FIG. 13
FIG. 14

ANTI-SLIDE SPLICE WELDER

FIELD OF THE INVENTION

This invention relates to an ultrasonic welding apparatus and a method of operating the same. Particularly, the invention relates to an ultrasonic apparatus including a plurality of anvils displaceable controllably to produce a desirable cross-section to allow electrical conductors to be welded substantially in at least one column and automatically formed before each welding operation. The invention relates a method for sequentially displacing a plurality of anvils to produce the desirable cross section to obtain a weld including at least one column of welded conductors.

BACKGROUND OF THE INVENTION

Use of devices adapted to ultrasonically weld electric conductors, preferably in stranded form, has become a preferable method of welding in electronic industry. An ultrasonic welder is typically provided with a welding tip which produces ultrasonic vibration and an anvil as a mating tool. The anvil includes a plurality of faces, each movable along a linear path to define a space in which the conductors can be compressed to varying dimensions while ultrasonic vibration is being applied to them. When the anvil is closed and the conductors are being compressed to one another, the anvil faces form a peripherally closed compartment. When the anvil is open, the end faces are left open for the conductors to pass through it.

A device of this type is known from U.S. Pat. No. 4,867,370 to Welter et al. (Welter '370), where provision is made for variously dimensioned wires which are to be welded while maintaining a tight grip around the conductors.

FIGS. 1–4 of this application illustrate a mode of operation of Welter '370 that starts with having a wide open working area 4 receiving a bundle of wires 2 loosely inserted in this area. Upon positioning the wires in an arbitrary manner, components forming the working area move inwardly to tightly enclose the wires to be welded. As is disclosed in Welter '370, displacement of the components is a function of the fineness of wire ends and is sequenced to move a gathering block 6 following moving of anvil 16 and welding tip 8 to reduce the working area, as illustrated in FIGS. 1–3. Finally, as shown in FIG. 4, subsequent to the welding of the wires, the gathering tool moves away from the working area beyond its initial position, and then it is displaced back to its initial position.

It has been found that there is a greater efficiency of welding wires that are vertically stacked between a vibrating horn and stationary anvil, as compared to those wires that are adjacent to each other. The above discussed reference is representative of the state of art and discloses a multiplicity of wires many of which are positioned adjacent to each other along a welding surface of the tip. Others, however, although welded in a vertical plane tend to fill interstices between subsequent wires of the adjacent column and welded diagonally therewith which produces a relatively inefficient weld. As a consequence, some welds are weaker than others based on the way the wires have been loaded.

It is, therefore, desirable to provide an ultrasonic welding apparatus for wire splicing which automatically sets the position of the tooling so as to restrict a wire nest and require the operator to stack the wires in at least one vertical row extending from a welding tip. It is also desirable to provide a method of operating the ultrasonic apparatus and allowing the tooling to move away from the wire nest for a predetermined period of time, and subsequently to move back in an initial position characterized by a preset width.

SUMMARY OF THE INVENTION

This is obtained by a welding apparatus in accordance with the invention that automatically sets the position of the tooling so as to restrict a wire nest and require an operator to vertically stack the wires, thus assuring the highest quality weld.

In accordance with one aspect of the invention, the welding apparatus is provided with a memory unit containing a table of desirable dimensions of the wire nest in accordance with type and cross-section of the wires to be welded.

Still, further, the memory can contain a table of desirable pressures which is preferably inserted by an anvil upon a stack of wires placed in the pre-set wire nest in accordance with the type and approximate quantity of the wires to be welded.

According to another aspect of the invention, a gathering tool constituting one of the anvil surfaces, which form a wire nest of the ultrasonic apparatus, automatically reciprocally moves away from and back to an initial position corresponding to the preset dimension of the wire nest. The displacement of the gathering tool is arrested for a preset period of time before moving back to the initial position to allow the operator to safely remove the splice.

In accordance with still a further aspect of the invention, a method of operating the apparatus is disclosed.

It is an object of the invention to provide a welding apparatus preventing side splices in order to improve splice quality.

Still another object of the invention is to provide a welding apparatus automatically setting a desirable dimension of a wire nest before a plurality of wires to be welded are placed in the nest, so as to provide a vertical stack of wires between the vibrating horn and stationary anvil.

A further object of the invention is to provide a plurality of wires to be welded with a desirable pressure sufficient to efficiently weld a stack of wires in accordance with the number and size of the wires to be spliced and with pre-set dimensions of the wire nest.

Another object of the invention is to provide a method of operating the ultrasonic apparatus in accordance with the invention.

BRIEF DESCRIPTION OF THE DRAWINGS

The above and other objects, features and advantages will become more readily apparent from the description of the preferred embodiment of the invention accompanied by the following drawings, in which:

FIG. 11 is a view similar to the previous views and illustrating a stage of loading the wires in the preset wire nest.

FIG. 12 is a top, partially broken away view of a vibrating horn provided with a welding tip in accordance with the invention.

FIG. 13 is a perspective view of a welding tip.

FIG. 14 is a cross sectional view of the welding tip along lines XIV—XIV seen in FIG. 13.

DETAILED DESCRIPTION OF THE DRAWINGS

Figure 1:
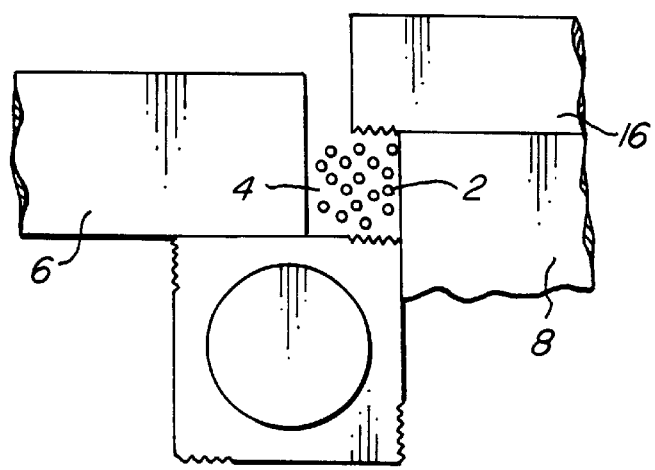
FIGS. 1–4 a front view in elevation, partly in cross-section, of an ultrasonic welding apparatus illustrated at different stages of a typical method of operation of the apparatus in accordance with the known prior art.
Figure 2:
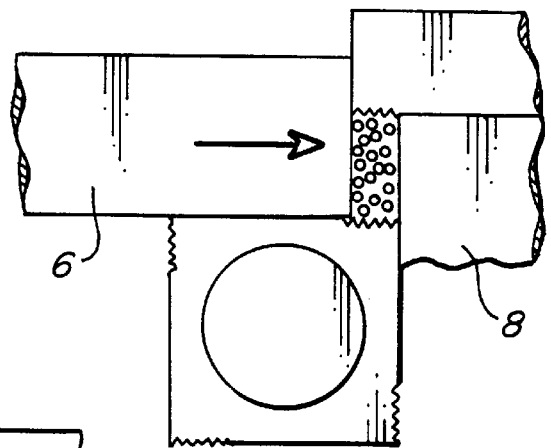
Figure 3:
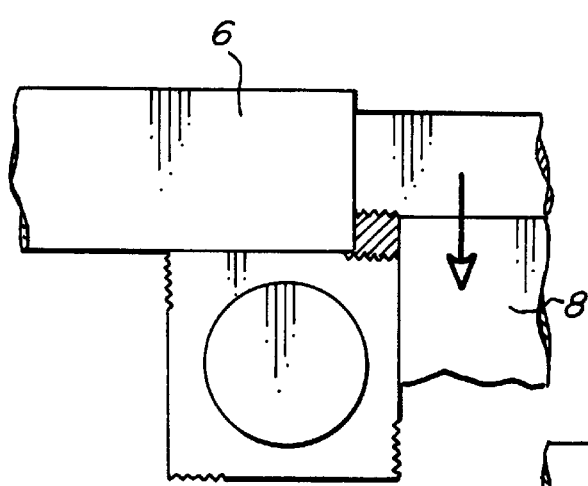
Figure 4:
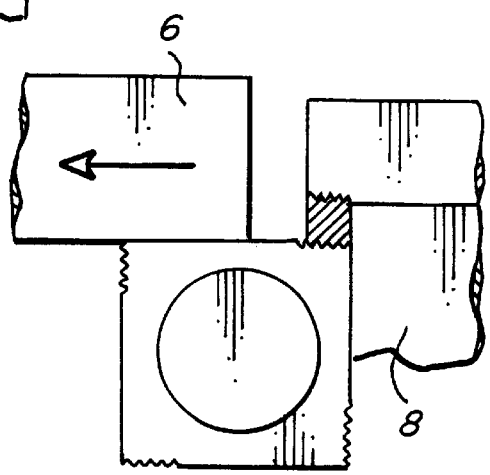

Referring to FIGS. 5–11 a welding apparatus 10 in accordance with the invention includes a tip guide 12 a vertical position of which with respect to a welding tip 18 may be adjusted by an actuator 14 shown only diagrammatically. The tip 18 removably attached to an ultrasonic welding horn 22 serves as a reference surface for the entire structure, and is juxtaposed with the tip guide 12 to arrest the tip guide's displacement in a predetermined position. The tip 18 is preferably square in cross section, as better illustrated and explained in FIGS. 12–14 and may have a plurality of workfaces 20 receiving wires 24 to be spliced. The workfaces, each adjacent a respective corner, can be serrated for facilitating loading of the wires 24.

Mounted on the tip guide 12 is an anvil 26 displaceable laterally and parallel to the tip guide 12 in a direction of arrow A by an actuator 28, which is preferably an air piston and cylinder unit. Completing a combination of displaceable elements of the present invention is a gathering tool 30 movable parallel to the anvil and tip guide upon actuation of a mother screw 32. All of the elements are automatically displaceable relative to one another to form a wire nest 34, as is explained herein below.

Figure 5:
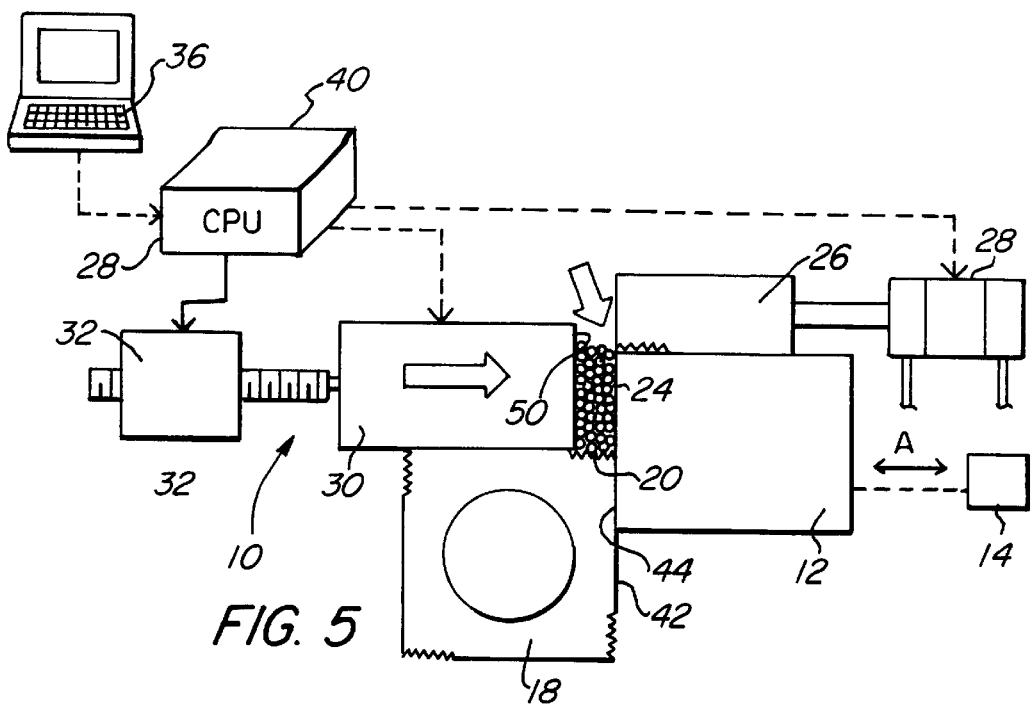
FIGS. 5 is a front view in elevation, partly in cross-section, of a welding apparatus at a stage wherein a plurality of wires is loaded in a preset wire nest.

Referring specifically to FIGS. 5 and 11, an operator using a scroll down menu 36 introduces a data including a type of an individual workpiece, which data is inputted in a CPU 38 typically having a memory 40 which contains a size of the introduced type. Additionally, an operator introduces a size of the entire bundle of workpieces in accordance with the operator's knowledge and experience based on the fact that the electrical wires to be welded have the precise size. As a result, the movable anvil surfaces are actuated in a predetermined sequence, as explained hereinbelow, to form a preset width of the wire nest as per memory 40 sufficient to form a predetermined width of the wire nest. Particularly, this width W=DN, wherein D is a diameter of single wire or workpiece, and N is a number of columns. As will be explained below, this width is sufficient only to place the wires in a series of adjacent vertical columns to achieve a high quality weld.

Initially, as shown in FIG. 11, the welding tip 18 and tip guide 12 are displaceable to either have their meeting surfaces 42, 44, respectively, stopped at a very small distance, such as at most 0.002 inches, from each other or contacted each other. It is desirable to avoid a frictional load between movable parts of the apparatus during presetting the wire nest. However, once the predetermined width is set, the parts may move further to close up the distance therebetween so as to ensure that none of the wires, subsequently loaded in the wire nest, is caught between the parts during welding.

Subsequently, the gathering block is actuated to move towards the surface 44 of the tip guide 12. Since the CPU 38 automatically controls the displacement by, for instance, controlling a number of turns of the screw 32 per time unit, the gathering block comes to a stop at a predetermined distance from the surface 44. Typically, this distance corresponds to a desirable width of the wire nest sufficient for stacking the wires in at least one column extending vertically from the welding tip. The displacement of the gathering block is arrested once it reaches a predetermined position corresponding to a desirable width of the work nest.

Alternatively, the sequence of controllably displacing the tip guide 12 and the gathering block 30 can be reversed by first moving the gathering block at a predetermined distance, and only then, displacing the tip guide to form the preset width of the wire nest in response to the introduced data. Further, it is possible to simultaneously displace the gathering block and tip guide to obtain the preset width in accordance to the introduced data.

Regardless of the sequence leading to the preset width of the wire nest, only after it has been thus obtained, an operator loads wires 24 that can be positioned there only in a vertical plane, as shown in FIG. 5. If, however, the number of wires are great, then the width of the wire nest is set to be W=DN, as explained above. In this case, the width is preset to provide a space sufficient only for a limited number of columns, each extending in a vertical plane which is parallel to the others. In other words, there is no room between adjacent columns sufficient for the wires constituting one of the columns to get vertically misaligned and shift between two adjacent columns. Having the wires to be spliced stacked in parallel columns not only prevent spaying and plastic extrusion during the welding process, but such arrangement also assures a high quality bond between the welded wires.

Figure 6:
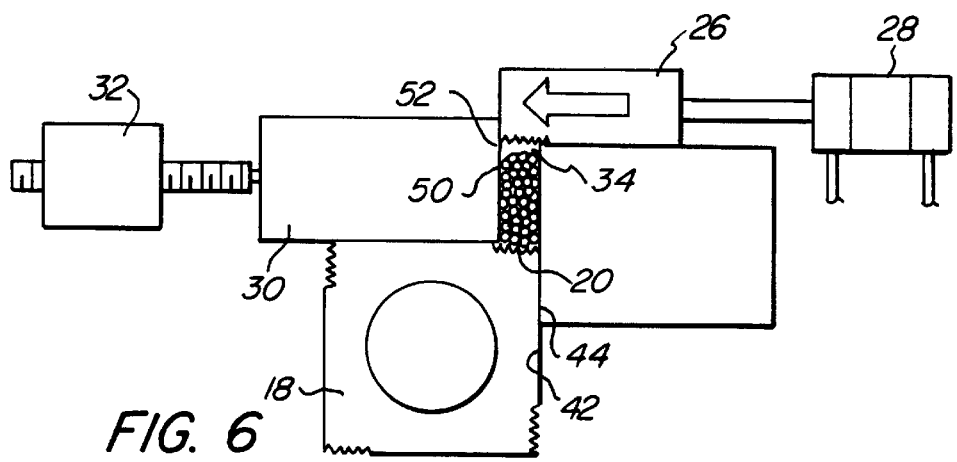
FIG. 6 is a view similar to the one shown in FIG. 5 and illustrating a subsequent stage wherein the wire nest is enclosed.

In the next stage of operation, as shown in FIG. 6, the anvil 26 controllably moves towards the gathering block upon the actuation of the air piston and cylinder unit 28 to stop at a small distance from a surface 50 of the gathering block. An amount of air pressure stored in the memory 40 of the CPU 38 may control the displacement of the anvil. Similarly to the controllable displacement of the gathering block, in addition to the controllable air pressure, a sensor 46 may be installed to signal the end of the travel. As a result of such displacement, the wire nest containing at least one vertical column of the wires to be spliced is fully enclosed by surfaces 50, 52, 20 and 44 of the gathering block, anvil, tip guide and the welding tip, respectively.

Figure 7:
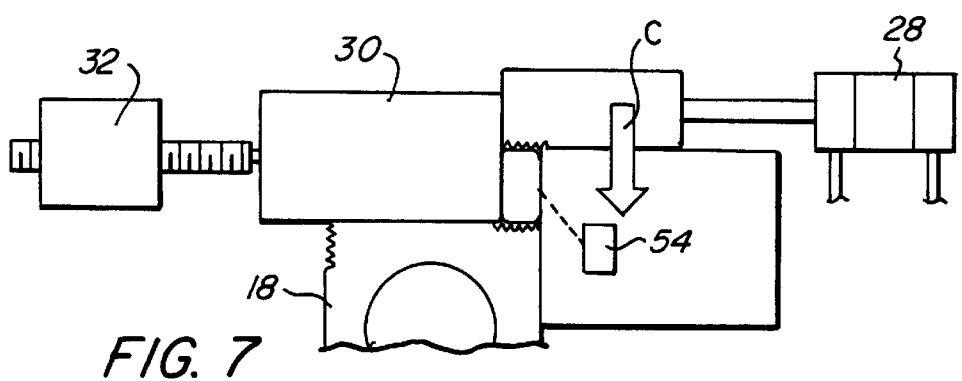
FIG. 7 is a view similar to the one shown in FIG. 6 and illustrating a stage at which the wire nest has a reduced cross section upon displacing a surface, which exerts a predetermined pressure upon a stack of wires.

Subsequent to forming the wire nest, as shown in FIG. 7, the anvil 26 and the tip guide 12 move vertically downward, as indicated by arrow C, to reduce the size of the wire nest. This displacement is controlled by the CPU 38 to exert a predetermined pressure, as is stored in the memory 40, upon the stack of wires. Additional pressure sensors 54 shown diagrammatically and connected to the CPU 38 control the exerted pressure so it would be within a desirable range providing a high efficiency weld.

After the wire nest has been formed in accordance with the sequence described above, welding of the wire ends 24 is effected by the ultrasonic horn 22 vibrating the welding tip 18 parallel to the longitudinal axis of the wires and perpendicular to displacement of the tooling along arrow A. Preferably the welding tip is oscillated at a frequency of 20–40 kHz.

Figure 8:
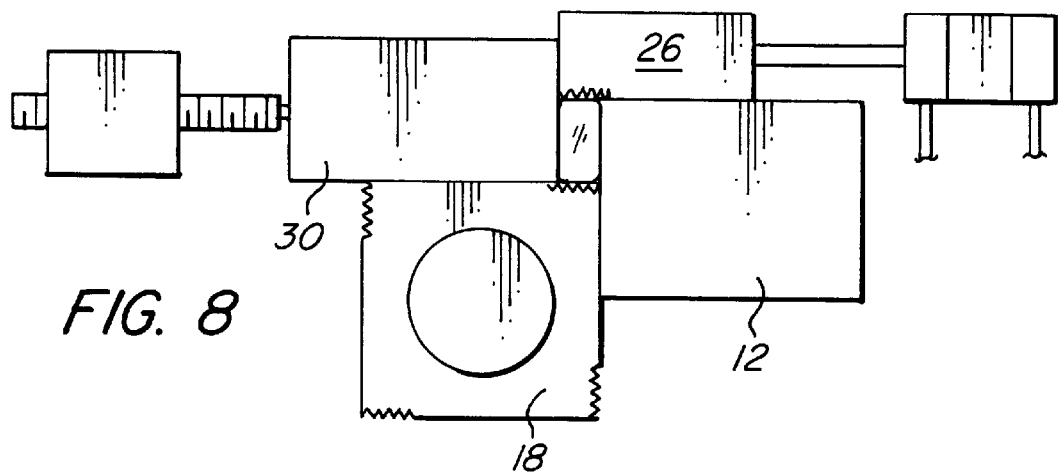
FIG. 8 is a view similar to the previous views and illustrating the welding apparatus in accordance with the invention at a stage of forming the splice.
Figure 9:
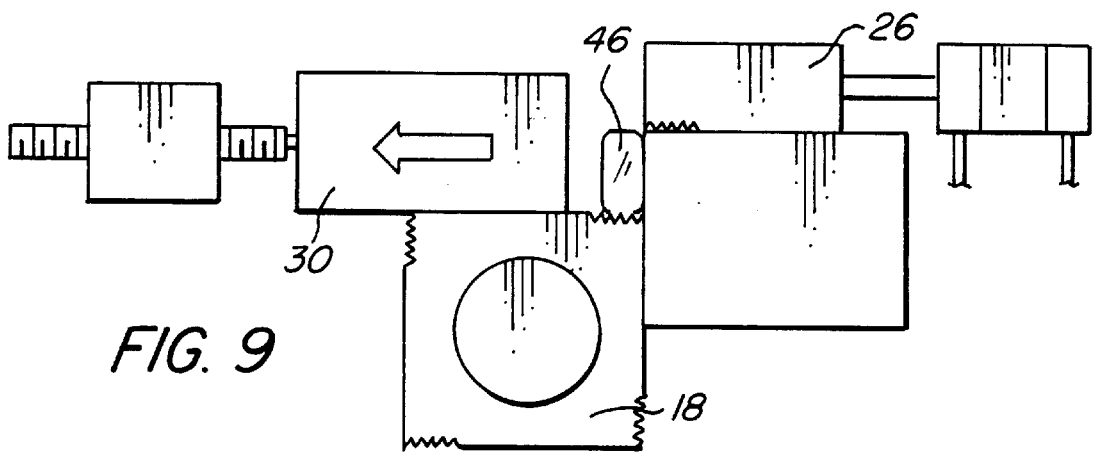
FIG. 9 is a view illustrating the welding apparatus in accordance with the invention at a stage of removing the splice.
Figure 10:
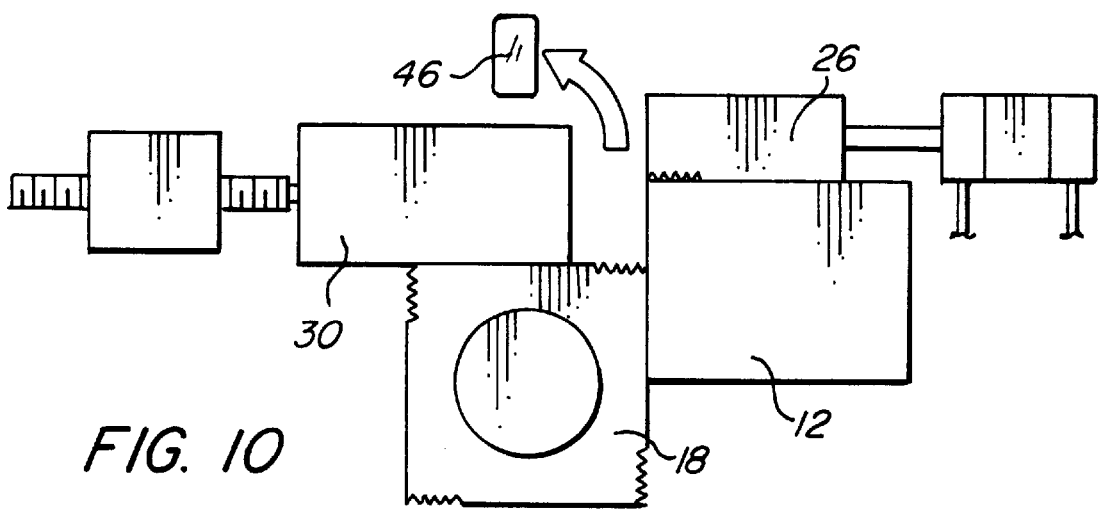
FIG. 10 is a view similar to the one shown in FIG. 4 and illustrating a stage an initial stage wherein a pre-set dimension of the wire nest is automatically established.

As a result of welding, the wires as shown in FIG. 8 are spliced and posses hydraulic pressure so to remove the spliced wires from the wire nest the gathering block, anvil and tip guide are retreated to a position shown in FIG. 9. After a predetermined period of time controlled by the CPU and sufficient for an operator to remove a slice 46 (FIG. 10), the gathering tool is displaced back to stop at the predetermined distance from the tip guide, as shown in FIG. 5. This period can last up to 5 seconds which allows the operator to remove the slice and his/her hands before the gathering tool moves back to the initial position defining a predetermined width of the wire nest, as illustrated in FIG. 11. The gathering block and the anvil may start moving away from the wire nest either simultaneously or, preferably, sequentially by first retreating of the gathering bock, and then moving the anvil 26 away from the nest.

During repeated use of ultrasonic welding process, both the horn 22 and the tip 18, as shown in FIGS. 12–14 are exposed to substantial wear as a result of the ultrasonic vibration which generates a substantial amount of heat leading to premature failures of the tip and horn. To overcome this problem, the tip 20 has a pair of spaced apart holes 60, each of which has a continuous concentric pad 62, better seen in FIG. 14, that receives a respective bolt 64 fastening the tip 18 to an end face of the horn 22. As a consequence, focusing the ultrasonic vibration in a close proximity to the bolt holes 60 by efficiently transmitting ultrasonic vibration through the pads 62 kept intact with the horn by means of the concentrated clamping force of the bolts. The extended surfaces of the tip provided with work surfaces 20 are free to vibrate without harm to the horn or welding tip, which improves productivity and quality of the weld as well as durability of the vibrating parts of the apparatus.

As shown in FIG. 13, the welding tip has four serrated work surfaces (only tow are shown), three of which are auxiliary to form a new welding surface upon exhaustion of the previously used surface by simply rotating the tip 18 around the horn 20.

Although the invention has been described with reference to a particular arrangements of parts, features and the like, these are not intended to exhaust all possible arrangements or features, and indeed many other modifications and variations will be ascertainable to those of skill in the art.

What is claimed is:

1. A method of welding a plurality of workpieces, comprising the steps of:
    positioning a welding tip and a tip guide adjacent to one another;
    controllably advancing a gathering block toward the tip guide to stop it in an initial position at a predetermined distance from the tip guide, thereby establishing a preset width of a partly open workpiece nest;
    loading workpieces to be welded in the nest on the ultrasonic tip, said preset width being selected so that the workpieces are loaded in a vertical alignment with one another to form at least one vertical column adjacent to the tip guide and the gathering block;
    controllably displacing an anvil downward toward the welding tip to peripherally close the workpiece nest, thereby exerting a predetermined pressure upon the column;
    ultrasonically agitating the working tip to produce a splice;
    displacing the gathering block away from the initial position to a rest position;
    resting said gathering block in the rest position for a predetermined period of time, thereby removing the splice from the workpiece nest; and
    moving the gathering block back to the initial position, thereby establishing the preset width of the workpiece nest for receiving workpieces to be welded.

2. The method defined in claim 1, further comprising the step of introducing a data containing a diameter D of single workpiece and an approximate number of the workpieces to be welded, the gathering block being displaceable to form the preset width of the nest substantially equal to the diameter D times number of columns N in response to the introduced data.

3. The method defined in claim 2, further comprising the step of sensing contact between the one column and the gathering block and the tip guide upon loading of the workpieces to be welded in the workpiece nest.

4. The method defined in claim 1, further comprising the step of controllably displacing the anvil toward and away from the gathering block, thereby enclosing and opening the workpiece nest for subsequent welding and removal of the splice.

5. The method defined in claim 4, further comprising the step of sensing the pressure exerted upon the one column by the anvil upon its displacement towards the welding tip.

6. The method defined in claim 1, further comprising the step of delaying the displacement of the gathering block to the initial position for a predetermined period of time.

7. The method defined in claim 6, wherein the predetermined period of time does not exceed 5 seconds.

8. The method defined in claim 1, further comprising the step of simultaneously displacing the anvil and tip guide toward the welding tip to controllably close the workpiece nest, the welding tip having a work surface extending generally in a horizontal plane and flanked by spaced apart side surfaces, one of which is adjacent to a meeting surface of the tip guide extending vertically beyond the welding tip to form one of the walls of the workpiece nest.

9. The method defined in claim 8, wherein the working surface of the welding tip is serrated and is parallel to a bottom of the anvil formed with a serrated portion which faces the working surface of the welding tip upon enclosing the workpiece nest.

10. A method of ultrasonically welding workpieces, comprising the steps of:
    introducing a data corresponding to a diameter of a single workpiece to be welded with a plurality workpieces, each having the diameter and collectively forming a bundle of predetermined size;
    forming a partially open workpiece nest by displacing gathering block and tip guide block linearly in opposite directions to form side surfaces of the workpiece nest;
    arresting the displacement of the tip guide and gathering blocks to obtain a predetermined width of the workpiece nest corresponding to the predetermined size of the bundle of workpieces in response to the introduced data;
    loading a plurality of workpieces substantially aligned with one another in a vertical plane on the welding tip in the workpiece nest, thereby forming at least one vertical column abutted by the side surfaces of the workpiece nest;
    controllably displacing an anvil toward the welding tip to exert a predetermined pressure upon the one column, thereby forming a splice; and
    reciprocally displacing at least one of the gathering and tip guide blocks away from the workpiece nest to provide a predetermined period of time sufficient to remove the splice, and back to repeatedly provide the predetermined width of the workpiece nest.

* * * * *